United States Patent [19]

Suter et al.

[11] 3,886,199

[45] May 27, 1975

[54] MANUFACTURE OF DIESTERS OF DICARBOXYLIC ACIDS WITH SUBSTANTIAL WASTE WATER PURIFICATION

[75] Inventors: Hubert Suter; Rosemarie Berger, both of Ludwigshafen; Hansjoerg Bipp, Limbergerhof; Gert Buerger, Mannheim; Kurt Hauptmann, Hassloch; Otto Kratzer, Bobenheim-Roxheim; Willi Reimer, Ludwigshafen, all of Germany

[73] Assignee: Badische Anilin- & Soda-Fabrik Aktiengesellschaft, Ludwigshafen/Rhine, Germany

[22] Filed: June 18, 1973

[21] Appl. No.: 371,139

[30] Foreign Application Priority Data

June 21, 1972 Germany............................ 2230226

[52] U.S. Cl............................ 260/475 B; 260/485 S

[51] Int. Cl...................... C07c 69/34; C07c 69/80
[58] Field of Search......... 260/475 B, 475 R, 485 S, 260/485 R

[56] References Cited

UNITED STATES PATENTS 3,843,697   10/1974   Khaidukov et al. ............. 260/485 S

*Primary Examiner*—Lorraine A. Weinberger
*Assistant Examiner*—E. Jane Skelly
*Attorney, Agent, or Firm*—Johnson, Keil, Thompson & Shurtleff

[57] ABSTRACT

Manufacture of diesters of dicarboxylic acids from aliphatic or aromatic dicarboxylic acids or their anhydrides and alcohols of from three to 15 carbon atoms, in which substantial purification of the waste water is achieved by treating the waste water with the same alcohol as used in the ester synthesis.

6 Claims, 1 Drawing Figure

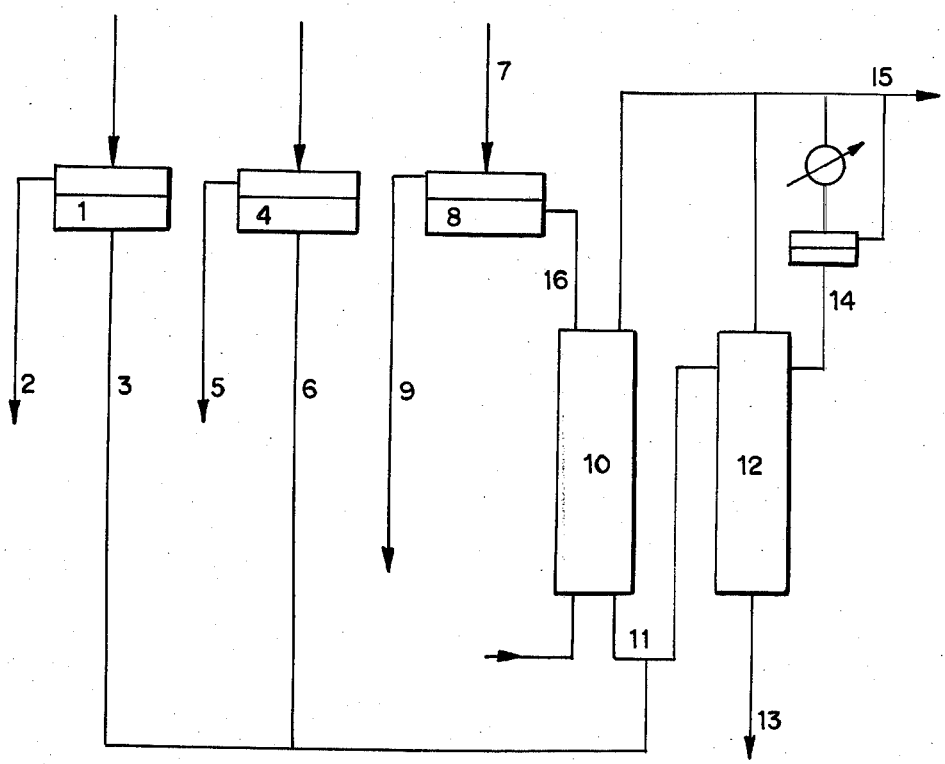

MANUFACTURE OF DIESTERS OF DICARBOXYLIC ACIDS WITH SUBSTANTIAL WASTE WATER PURIFICATION

This invention relates to a novel process for the manufacture of diesters of dicarboxylic acids with substantial purification of the waste water.

It is well known that diesters of dicarboxylic acids may be made from aliphatic or aromatic dicarboxylic acids and higher alcohols by reaction of the dicarboxylic acids or their anhydrides with the alcohols at elevated temperatures in the presence or absence of esterification catalysts and/or entraining agents.

In a highly advantageous industrial process, diesters of phthalic acid, which are required in large quantities for use as plasticizers, are prepared from phthalic anhydride and the appropriate alcohol with recycling of the alcohol, which is used in excess, and in the absence of esterification catalysts and entraining agents, the temperatures used being from 180° to 250° C. In this continuous process, which is described in German Published Application 1,225,164 and in Chemie Ing. Technik 41 (1969) page 971 and in which yields of approx. 98% of theory are obtained, the problem of recycling the excess starting material and also the monoester formed as a result of incomplete conversion has been substantially solved both from a chemical and from a technological point of view. However, the waste water problem has not been solved. During this process, waste water in need of treatment is formed at the following stages in the order given:

a. during esterification, which proceeds with the elimination of water of reaction, the latter being removed with excess alcohol by distillation, whilst the alcohol is recycled;

b. during the process of steaming out the crdue ester containing residues of water and alcohol;

c. during the treatment of the crude ester with aqueous alkali for extraction of the monoester and during acidification of the resultant aqueous monoester salt solution with sulfuric acid; and d. during washing of the monoester isolated in stage (c), this operation being necessary for complete removal of the sulfuric acid.

The aqueous condensates from the first two stages are saturated with alcohol, whereas the waste waters obtained in the other two stages contain not only alcohol but also, inter alia, residues of dicarboxylic acid, monoester, diester and sulfuric acid. Since these waste waters containing organic substances have hitherto been discarded untreated, they have given rise to an environmental problem and there has resulted a need to provide a process for the manufacture of diesters of dicarboxylic acids in which the said objectionable waste water are avoided even when the process is carried out on an industrial scale in sustained operation.

Ways of solving such a problem on an industrial scale would be, for example, to add activated characoal to the waste waters followed by removal and incineration of said activated charcoal, or to effect direct incineration of the entire waste waters. Both or these methods and also biological clarification of the waste waters over long residence times are not only expensive and inconvenient in large scale work but also exclude the possibility of recovering starting materials and intermediates.

We have now found that in a continuous process for the manufacture of diesters of dicarboxylic acids from aliphatic or aromatic dicarboxylic acids or their anhydrides and alcohols of from three to 15 carbon atoms, in which esterification is carried out with recycling of the alcohol used in excess and in the absence of esterification catalysts at temperatures of from 150° to 250° C and in which the reaction mixture is separated from the water of reaction, steamed out and then mixed with aqueous alkalis for separation of the monoester, the resulting aqueous monoester salt solution being acidified for the recovery of the monoester, the above waste water problems are avoided if the aqueous monoester salt solution is treated with from 0.5 to 1 times its weight of the same alcohol as used in the ester synthesis, before, during or after acidification, the resulting mixture is separated into the alcoholic and aqueous phases and the resulting waste water is extracted with from 1 to 2 times its weight of the same alcohol, the alcoholic phase from this extraction is recycled to the esterification and alcohol is separated from the combined waste waters.

Suitable aliphatic and aromatic dicarboxylic acids or anhydrides thereof are for example phthalic anhydride, maleic anhydride and dicarboxylic acids of the formula $HOOC-(CH_2)_n-COOH$ in which n denotes a whole number of from 1 to 8, such as adipic acid, furmaric acid, malonic acid, succinic acid, glutaric acid, pimelic acid, suberic acid, azelaic acid and sebacic acid. The use of phthalic anhydride and adipic acid is of particular commerical interest. Suitable alcohols of from three to 15 carbon atoms are for example butanol, n-octanol-1, n-octanol-2, 2-ethylhexanol-1, n-nonyl alcohol, decanol and isodecanol.

Esterification of the starting material is carried out in the usual manner in the absence of esterification catalysts and preferably also in the absence of entraining agents with recycling of the alcohol used in excess, this excess being up to 2 moles and preferably up to 1 mole of alcohol per mole of dicarboxylic acid or anhydride.

The process according to the present invention is described below by way of example with reference to the accompanying drawing.

The mixture of water of reaction and alcohol distilled over from the esterification apparatus is collected in a separator 1. The alcohol is recycled to the esterification apparatus through line 2 and the water of reaction is led off through line 3. The crude ester is substantially freed from excess alcohol and water, which are collected in the separator 4, by steaming — conveniently at a reduced pressure of, say, from 10 to 100 mm of Hg and temperatures of, say, from 100° to 150° C. The alcohol is recycled to the esterification apparatus through line 5, whilst the waste water is led off through line 6. The crude ester is washed with aqueous alkali, conveniently with dilute caustic soda or sodium carbonate solution, preferably with a 2 to 7% caustic soda solution. The resulting aqueous phase containing the monoester in the form of an alkali metal salt is acidified with an acid, advantageously sulfuric acid, e.g. concentrated sulfuric acid having a concentration of from 50 to 98% w/w.

To the aqueous monoester salt solution there is added, before, during or after acidification, from 0.5 to 1 times its weight of the same alcohol as used for the ester synthesis, for example at temperatures of up to 100° C and preferably of from 70° to 95° C. We prefer to add the alcohol after acidification. The resulting mixture is passed through line 7 to a third separator 8, where it is separated into aqueous and alcoholic phases. The alcoholic phase containing the monoester is passed through line 9 back to the esterification apparatus. The aqueous phase is extracted with from 1 to 2 times its weight of the same alcohol. This extraction is conveniently carried out in a pulsed extraction column 10 at temperatures of from 50° to 100° C. The aqueous phase obtained is then combined, via line 11, with the waste waters coming from the separators 1 and 4. The residual alcohol is substantially removed from the combined waste waters, for example in an alcohol separating column. The procedure may be as follows: some of the waste water is evaporated together with the alcohol, the vapors are condensed, the condensate is separated and the condensed water is recycled to the column 12 via line 14 whilst the condensed alcohol is recycled to the esterification apparatus via line 15. The waste water from column 12 and consisting of the combined waste water from the entire ester synthesis which have been purified in the manner proposed by the invention, is discarded via line 13.

The final waste water leaving the process of the invention is below the permissible waste water impurity level of a BOD of 30 mg/1 as specified in the third edition of "Deutsche Einheitswerte zur Wasser-Abwasser-Schlammaufbereitung." In our novel process, starting materials and intermediates are substantially all recycled to the esterification process, and consequently the novel process is superior to the prior art process also in respect of yield. Finally, the procedure employed in the present invention gives a surprisingly advantageous result in that the separation of the monoester after acidification of the aqueous monoester salt solution by the addition of the alcohol is considerably accelerated and also provides complete separation of the sulfuric acid. This unexpected and advantageous result makes it unnecessary to wash the monoester, as has hitherto been done to remove the final traces of sulfuric acid where it has been desired to avoid damage to the ester leading, for example, to discoloration thereof.

EXAMPLE 1

The aqueous monoester salt solution obtained in the continuous manufacture of di-2-ethylhexyl phthalate by the process described in German Published Application 1,225,164 is acidified with 96% sulfuric acid. The acidified mixture is then mixed with from 0.5 to 1 times its weight of 2-ethylhexanol at from 70° to 95° C. The resulting mixture having a pH of 2.5 to 1 is then separated in separator 8 into the alcoholic and aqueous phases. The alcoholic phase, which mainly contains the half-ester, is recycled to the esterification apparatus. The aqueous phase, which contains approximately 2.5% w/w of phthalic acid, 0.2% w/w of 2-ethylhexanol and traces of di-2-ethylhexyl phthalate and mono-2-ethylhexyl phthalate and which has a BOD of 28,000 mg/1, passes at a rate of 0.339 m³/hr through line 16 to the extraction column 10 provided with 80 practical trays. In this column, the waste water is contacted with a counter-current of 0.661 m³/hr of 2-ethylhexanol at approximately 80° C. Whereas the alcohol is passed through line 15 back to the esterification apparatus, the waste water which substantially contains only that amount of 2-ethylhexanol which corresponds to the solubility of this alcohol in water and which has a BOD of 400 mg/1, is passed, together with the waste water from separator 1 (i.e., 0.076 m³/hr) and the waste water from separator 4 (i.e., 0.118 m³/hr) to the alcohol separating column 12. In this column 12, the remaining 2-ethylhexanol is substantially removed from the waste water mixture at 100° C by blowing steam through the mixture. The 2-ethylhexanol passes through line 15 to the esterification apparatus and the remaining waste water is discarded. The thus treated waste water has a BOD of 18 mg/1 and is thus considerably below the permissible waste water impurity level of 30 mg/1. The removal of the organic compounds from the waste water and recycling thereof to the esterification zone causes the yield of ester, based on phthalic anhydride and 2-ethylhexanol, to be raised from 98% to 99% of theory.

EXAMPLE 2

Example 1 is repeated except that di-2-ethylhexyl adipate is produced instead of di-2-ethylhexyl phthalate. From separator 8 waste water flows to the column 10 via line 16 at a rate of 0.266 m³/hr, this waste water containing approximately 2.5% w/w of adipic acid, 0.2& w/w of 2-ethylhexanol and traces of di-2-ethylhexyl adipate and mono-2-ethylhexyl adipate. The BOD of this waste water is 15,00 mg/1. In column 10, 0.534 m³/hr of 2-ethylhexanol are contacted countercurrently for extraction purposes. Extraction takes place at an average temperature of 80° C. The waste water flowing through line 11 has a BOD of 300 mg/1. Separation of 2-ethylhexanol from this waste water, which is effected, as in Example 1, in column 12 together with the esterification waste water from line 3 (0.060 m³/hr) and the waste water from line 6 (0.092 m³/hr), provides a final waste water which leaves through line 13 with a BOD of 20 mg/1. This is below the permissible level of 30 mg/1. Recycling of the crude products raises the yield from 98 to 99% of theory, based both on adipic acid and on 2-ethylhexanol.

EXAMPLE 3

Example 1 is repeated except that di-isodecyl phthalate is produced instead of di-2-ethylhexyl phthalate. From separator 8 waste water containing approximately 2.5% w/w of phthalic acid, approx. 0.2% w/w of isodecanol and traces of di-isodecyl phthalate and mono-isodecyl phthalate, passes through line 16 to the extraction column 5 at a rate of 0.285 m³/hr. The BOD of this waste water is 16,000 mg/1. This waste water is extracted in the column by a countercurrent of 0.570 m³/hr of isodecanol. Extraction takes place in column 10 at an average temperature of 80° C. The waste water passing through line 11 has a BOD of 350 mg/1. Separation of the isodecanol from this waste water, which is effected, as in Example 1, in column 12 together with the waste water from separator 1 (0.065 m³/hr) and the waste water from separator 4 (0.099 m³/hr), provides a final waste water which leaves through line 13 with a BOD of 25 mg/1. This is below the permissible level of 30 mg/1. In this case also, the yield is raised from 98 to 99%, based on the starting materials.

We claim:

1. In a continuous process for the manufacture of the diester of a dicarboxylic acid by esterification of a dicarboxylic acid component selected from the group consisting of phthalic anhydride, maleic anhydride and acids of the formula $HOOC-(CH_2)_n-COOH$ in which n is a whole number of 1 to 8 with an alcohol selected from the group consisting of butanol, n-octanol- 1, n-octanol-2, 2-ethylhexanol-1, n-nonyl alcohol, decanol and isodecanol, esterification being carried out with recycling of the alcohol used in excess and in the absence of an esterification catalyst at a temperature of from 150° to 250° C and the reaction mixture being separated from the water of reaction, steamed out and then mixed with an aqueous alkali for separation of the monoester, the resulting aqueous monoester salt solution being acidified for the recovery of the monoester, the improvement which comprises:

treating the aqueous monoester salt solution after acidification with from 0.5 to 1 times its weight of the same alcohol as used in the ester synthesis;

separating the resulting mixture into alcoholic and aqueous phases and then extracting the separated aqueous phase with from 1 to 2 times its weight of the same alcohol;

recycling the alcoholic phase from said separation and said extraction to the esterification reaction;

combining said water of reaction separated from the esterification reaction mixture as a waste water with said aqueous phase resulting from the extraction step; and removing the alcohol traces which remain in the resulting combined waste water and aqueous phase by blowing steam therethrough.

2. A process as claimed in claim 1, wherein the dicarboxylic acid or dicarboxylic anhydride used is adipic acid or phthalic anhydride and the alcohol used is 2-ethylhexanol-1.

3. A process as claimed in claim 1, where the addition of alcohol to the aqueous monoester salt solution is carried out at temperatures of up to 100° C.

4. A process as claimed in claim 1, wherein the extraction of separated aqueous phase with from 1 to 2 times its weight of alcohol is carried out at temperatures of from 50° to 100° C.

5. A process as claimed in claim 1 wherein the dicarboxylic acid component is adipic acid.

6. A process as claimed in claim 1 wherein the dicarboxylic acid component is phthalic anhydride.

* * * * *